3,823,137
Patented July 9, 1974

3,823,137
NOVEL NITROFURAN COMPOUNDS AND PHARMACEUTICAL COMPOSITIONS

Herbert Berger, Mannheim-Kafertal, Rudi Gall, Grobsachsen, Max Thiel and Wolfgang Vomel, Mannheim, and Winfriede Sauer, Mannheim-Wallstadt, Germany, assignors to Boehringer Mannheim GmbH, Mannheim, Germany
No Drawing. Continuation-in-part of application Ser. No. 151,991, June 10, 1971. This application Sept. 20, 1972, Ser. No. 290,681
Claims priority, application Germany, June 20, 1970, P 20 30 581.1; May 10, 1972, P 22 22 834.8
Int. Cl. C09b 23/00
U.S. Cl. 260—240.1        11 Claims

ABSTRACT OF THE DISCLOSURE

Certain novel nitrofuran compounds of the formula

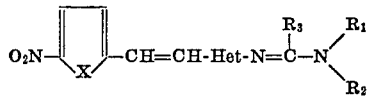

wherein Het is a naphthyridine or s-triazolo[4,3-b]pyridazine system and the R's are variously defined, which are outstandingly effective bacteriostats and bactericides.

---

This application is a continuation-in-part of Ser. No. 151,991 filed June 10, 1971.

The present invention is concerned with new nitrofuryl-amidine and nitrothienyl-amidine compounds and is also concerned with pharmaceutical compositions containing the new nitrofuryl-amidine compounds.

The new compounds according to the present invention are compounds of the general formula:

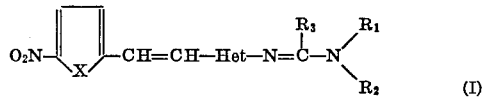

wherein $R_1$, $R_2$ and $R_3$, which may be the same or different, are hydrogen or lower alkyl, alkoxyalkyl, hydroxyalkyl, alkylmercaptoalkyl, cyclohexyl or hydroxy-phenyl, or two of the symbols $R_1$, $R_2$ and $R_3$, together with the atoms to which they are attached, can also form a 5- or 6-membered ring, which ring optionally contains one or two additional nitrogen, oxygen or sulfur atoms and optionally is substituted with a hydroxyl group or a lower alkyl or hydroxyalkyl radical, X is a sulfur or oxygen atom and Het is a naphthyridine or s-triazolo[4,3-b]pyridazine system, which is optionally substituted by hydroxyl or amino groups or lower alkyl radicals; and the pharmacologically compatible salts thereof.

In German Pat. Specification No. 1,545,708, there are described three nitrofuran derivatives substituted with with amidine radicals, which derivatives have an antiparasitic and anti-bacterial action, the heterocyclic radical in these compounds being pyridazine or quinoline.

Surprisingly, we have now found that nitrofurylamidine derivatives which contain a naphthyridine or s-triazolo [4,3-b]pyridazine system as the heterocyclic system are substantially more effective and, in particular, exhibit a high anti-bacterial activity in the urinary tract.

The new compounds of general formula (I) according to the present invention can be prepared, for example, by one of the following methods:
(a) condensation of compounds of the general formula:

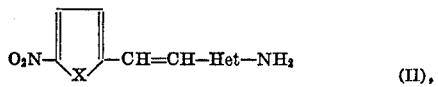

wherein X and Het have the same meanings as above, with acid amides of the general formula:

wherein $R_1$, $R_2$ and $R_3$ have the same meanings as above, or with a reactive derivative thereof, or
(b) reaction of compounds of the general formula:

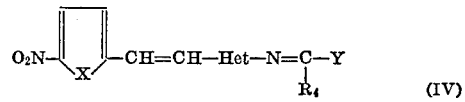

wherein X and Het have the same meanings as above, Y is a reactive group and $R_4$ is a hydrogen atom or a lower alkyl radical, with amines of the general formula:

$$R_1-NH-R_2 \qquad (V)$$

wherein $R_1$ and $R_2$ have the same meanings as above, or
(c) reaction of compounds of the general formula:

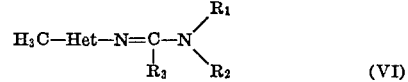

wherein $R_1$, $R_2$, $R_3$ and Het have the same meanings as above with 5-nitrofurfural-2 or with 5-nitrothiophene-aldehyde-2 or with reactive derivatives thereof, or
(d) nitration of compounds of the general formula:

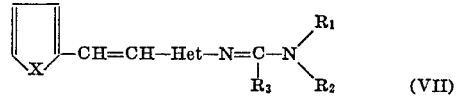

wherein $R_1$, $R_2$, $R_3$, X and Het have the same meanings as above, whereafter, if desired, the compounds obtained are converted into their pharmacologically compatible salts.

In the case of the reaction of the acid amides (III) with the amino-heterocyclic compounds (II), it is recommended to add agents splitting off water, for example phosphorus oxychloride. As active derivatives of the acid amides, there can be used, for example, thioamides, acetals, imino ethers, thioimino ethers and nitriles. Thioamides are reacted in a warm alcohol and acetals in an inert solvent, for example, in dioxan or dimethyl formamide. Imino and thioimino ethers, as well as nitriles, can be reacted in the melt or in hot solution. The compounds (II) can also be used in the form of salts, preferably as hydrochlorides or toluene-sulfonates. The N-monoalkylated acid amides (III) are, by means of phosphorus pentachloride, reacted via the imide chlorides.

As reactive group Y in compounds of general formula (IV), there are preferably used alkoxy and alkylmercapto radicals which react directly in polar solvents, possibly at an elevated temperature, with ammonia or with appropriately substituted amines.

The condensation of 5-nitrofurfural-2 or of 5-nitrothiophene-aldehyde-2 with compounds of general formula (VI) can only be carried out when the methyl radical on the hetero-cycle is in the ortho- or para-position to at least one activating nitrogen atom. The reaction takes place, for example, by boiling the components in acetic anhydride.

The nitration of compounds of general formula (VII) can be carried out in known manner with nitric acid in sulfuric acid and/or acetic anhydride, preferably at a reduced temperature. The compounds of general formula (IV) can be prepared in known manner by the reaction of compounds of general formula (II) with appropriate ortho-esters or via lower carbonyl derivatives, for example, the N-acetyl compounds, with subsequent reaction with trialkoxonium fluoroborates.

As reactive derivatives of the aldehydes used according to method (c), the diacetates are particularly preferred.

The pharmacologically compatible salts can be prepared, for example, by neutralization of the free amino groups of the compounds (I) with non-toxic inorganic or organic acids. As acids which can be used for this purpose, there may be mentioned, by way of example, hydrochloric acid, sulfuric acid, phosphoric acid, hydrobromic acid, acetic acid, lactic acid, citric acid, malic acid, salicylic acid, malonic acid, maleic acid, succinic acid and alkyl-sulfonic acids.

The inert compounds (I) according to the present invention can be administered orally or parenterally in admixture with a solid or liquid pharmaceutical diluent or carrier. As injection medium, it is preferred to use water, which contains the conventional additives for injection solutions, such as stabilization agents, solubilizing agents and/or buffers. Additives of this type include, for example, tartrate and borate buffers, ethanol, dimethyl sulfoxide, complex-forming agents (such as ethylenediaminetetraacetic acid) and high molecular weight polymers (such as liquid polyethylene oxide) for the regulation of viscosity. Solid carrier materials include, for example, starch, lactose, mannitol, methyl-cellulose, talc, highly-dispersed silicic acid, high molecular weight fatty acids (such as stearic acid), gelatine, agar-agar, calcium phosphate, magnesium stearate, animal and vegetable fats and solid high molecular weight polymers (such as polyethylene glycols). Compositions suitable for oral administration can, if desired, also contain flavoring and/or sweetening agents. For external use, the compounds (I) according to the present invention can also be used in the form of powders and salves; for this purpose, they are mixed, for example, with powdered, physiologically compatible diluents or with conventional salve bases.

The following Examples are given for the purpose of illustrating the present invention:

EXAMPLE 1

Preparation of 2-[2-(5-nitro-2-furyl)-vinyl]-7-(dimethylaminomethyleneamino)-1,8-naphthyridine 0.8 ml. phosphorus oxychloride were added at 25–30° C. to 0.67 ml. dry N,N-dimethyl-formamide in 3.5 ml. dry dioxan. The reaction mixture was subsequently stirred for 1 hour, thereafter 1 g. 2-[2-(5-nitro-2-furyl)-vinyl]-7-amino-1,8 - naphthyridine was added thereto and the reaction mixture further stirred for 5 hours at ambient temperature, then poured onto 50 g. crushed ice, undissolved material filtered off with suction after having stood for some time and washed with dilute aqueous ammonia solution and then with water and the crude product (0.93 g.) thus obtained recrystallized from 7 ml. dimethyl formamide, with the use of activated charcoal. There was thus obtained 0.5 g. 2-[2-(5-nitro-2-furyl)-vinyl] - 7 - (dimethylaminomethyleneamino) - 1,8-naphthyridine, which had a melting point of 210–212° C.

EXAMPLE 2

Preparation of 3-[2-(5-nitro-2-thienyl)-vinyl]-6-dimethylaminomethyleneamino)- s -triazolo[4,3-b]pyridazine 6-Amino - 3 - [2-(5-nitro-2-thienyl)-vinyl]-s-triazolo-[4,3-b]pyridazine is reacted with a dimethyl formamide-phosphorus oxyclhoride adduct in the manner described in Example 1. There is thus obtained thte desired 3-[2-(5-nitro-2-thienyl)-vinyl] - 6 - (dimethylaminomethyleneamino) - s - triazolo[4,3-b]pyridazine in the form of orange-yellow crystals which are paper chromatographically homogenous and have a melting point of 233–237° C.

EXAMPLE 3

Preparation of 3-[2-(5-nitro-2-furyl)-vinyl]-6-(dimethylaminomethyleneamino) - s - triazolo[4,3-b]pyridazine Variant A: A suspension of 0.5 g. 6-amino-3-[2-(5-nitro-2-furyl) - vinyl]-s-triazolo[4,3 - b]pyridazine and 0.5 g. dimethyl formamide-diethyl acetal in 3 ml. dimethyl formamide was heated to 100° C. for 1 hour. Thereafter, the reaction mixture was cooled and the yellow-brownish crystals were filtered off with suction and washed with dimethyl formamide and methanol. There was thus obtained 0.5 g. (83% of theory) 3-[2-(5-nitro-2-furyl)-vinyl] - 6 - (dimethylaminomethyleneamino)-s-triazolo[4,3-b]pyridazine, which had a melting point of 297–299° C.

Variant B: 6 - amino- 3-[2-(5-nitro-2-furyl)-vinyl]-s-triazolo[4,3 - b]pyridazine was reacted with a dimethyl formamide-phosphorous oxychloride adduct in a manner analogous to that described in Example 1. There was again obtained the same product as in Variant A above.

EXAMPLE 4

Preparation of 3-[2-(5-nitro-2-furyl) - vinyl] - 6-[(dimethylaminomethyl)-methyleneamino] -s-triazolo[4,3-b]pyridazine The pyridazine starting material used in Example 3 was reacted with an adduct of dimethyl-acetamide and phosphorus oxychloride in a manner analogous to that described in Example 1. There was thus obtained 3-[2-(5-nitro- - 2 - furyl)-vinyl]-6-[(dimethylaminomethyl)-methyleneamino]-s-triazolo-[4,3-b]pyridazine in the form of orange-colored crystals with a melting point of 278–282° C.

EXAMPLE 5

Preparation of 1-methyl-2-[3-(5-nitro-2-furyl)-vinyl] - s-triazolo-[4,3-b]pyridazinyl-6]-imino-pyrrolidine 2.08 ml. 1-methyl-2-pyrrolidine were dissolved in 8.6 ml. anhydrous dioxan, mixed dropwise with 1.92 ml. phosphorus oxychloride and the reaction mixture further stirred for 1 hour at 25–30° C. Thereafter, there was added a suspension of 2.7 g. 6 - amino-3-[2-(5-nitro-2-furyl) - vinyl]-s-triazolo[4,3-b]pyridazine in 6.2 ml. anhydrous dioxan and the reaction mixture stirred for a further 1.5 hours at 30–35° C. The reaction mixture was then poured onto ice, neutralized with dilute aqueous ammonia solution and the precipitated crystals filtered off with suction. After washing with water and methanol, followed by drying, there were obtained 2.8 g. 1-methyl-2-{3-[2-(5-nitro-2-furyl) - vinyl] - s - triazolo[4,3 - b]pyridazinyl-6} - imino - pyrrolidine. After recrystallization from dimethyl formamide, with the addition of activated charcoal, the compound was obtained in the form of orange-yellow crystals with a melting point of 254–258° C.

EXAMPLE 6

Preparation of 3 - [2 - (5-nitro-2-furyl)-vinyl]-6-[(diethylaminomethyl) - methylene]amino - s-triazolo[4,3-b]pyridazine The pyridazine starting material used in Example 3 was reacted with the adduct obtained from N,N-diethyl-acetamide and phosphorus oxychloride in a manner analogous to that described in Example 1; there was thus obtained 3-[2-(5-nitro-2-furyl)-vinyl]-6-[(diethylamino)-methylene]-amino-s-triazolo[4,3-b]pyridazine in the form of yellowish crystals which became red-colored at 124° C. and melted at 175–178° C.

EXAMPLE 7

Preparation of 3-[2-(5-nitro-2-furyl)-vinyl]-6-[(dimethylaminomethoxy-methyl)-methylene] - amino-s-triazolo [4,3-b]pyridazine The adduct of N,N-dimethyl-methoxy-acetamide and phosphorus oxychloride was reacted with the pyridazine starting material used in Example 3 in a manner analogous to that described in Example 1. There was thus obtained 3-[2-(5-nitro - 2-furyl)-vinyl]-6-[(dimethylaminomethoxy-methyl)-methylene]-amine-s-triazolo[4,3-b]pyridazine in the form of yellow crystals which melted at 205–211° C.

EXAMPLE 8

Preparation of 4-[2-(5-nitro-2-furyl)-vinyl]-2-methyl-7-(dimethylaminomethyleneamino)-1,8-naphthyridine In a manner analogous to that described in Variant A of Example 3, by the reaction of 4-[2-(5-nitro-2-furyl)-vinyl]-2-methyl-7-amino-1,8-naphthyridine with N,N - dimethylformamide-diethyl acetal, there was obtained 4-[2-(5-nitro-2-furyl)-vinyl]-2-methyl - 7 - (dimethylaminomethyleneamino)-1,8-naphthyridine in the form of yellowish crystals which melted, with decomposition, at 220° C.

EXAMPLE 9

Preparation of 3-[2-(5-nitro-2-furyl)-vinyl]-6-(dimethylaminomethyleneamino)-s-triazolo[4,3-b]pyridazine 0.5 g. 3-methyl - 6 - (dimethylaminomethyleneamino)-s-triazolo[4,3-b]pyridazine, together with 0.5 g. nitrofuran-2-aldehyde in 5.6 ml. acetic anhydride, was stirred at 100° C. After 35 minutes, the solution gradually began to crystallize. After a total of 2 hours, the reaction mixture was cooled and the precipitated crystals were filtered off with suction and then washed with a little acetic anhydride and alcohol. After drying, there was obtained 0.4 g. of a paper-chromatographically homogeneous substance. The mixed melting point with the compound prepared according to Example 3 showed no depression.

The starting material used was prepared in the following manner:

1.6 g. 3-methyl - 6 - amino-s-triazolo[4,3-b]pyridazine were heated to 100° C. for 1 hour with 4.7 g. N,N-dimethylformamide-diethyl acetal and 3.8 ml. dimethyl formamide. Upon cooling the reaction mixture, crystallization commenced. The crystals were filtered off with suction, washed with ether and dried to give 1.5 g. of a paper-chromatographically uniform substance which melted at 175–178° C. The NMR spectrum confirmed that this compound was 3 - methyl-6-(dimethylaminomethyleneamino)-s-triazolo[4,3-b]pyridazine.

EXAMPLE 10

Starting from 3-[2-(5-nitro-2-furyl)-vinyl]-6-amino-s-triazolo[4,3-b]pyridazine and proceeding in a manner analogous to that described in Example 5, with the use of an N-acetyl-pyrrolidine-phosphorus oxychloride adduct, there was obtained 3-[2-(5-nitro-2-furyl)-vinyl]-6-[1-(1-pyrrolidinyl)-ethylidene]-amino - s - triazolo[4,3-b]pyridazine, which melted at 240–243° C.; with the use of an N - methyl-2-piperidone-phosphorus oxychloride adduct, there was obtained 1 - methyl-2-{3-[2-(5-nitro-2-furyl)-vinyl] - s - triazolo[4,3-b]pyridazinyl-6}-imino-piperidine, which melted, with decomposition, at 246–248° C.; and with the use of N,N-diethyl formamide-phosphorus oxychloride adduct, there was obtained 3-[2-(5-nitro-2-furyl)-vinyl]-6-(diethylaminomethylene) - amino - s - triazolo[4,3-b]pyridazine, which melted at 192–196° C.

EXAMPLE 11

Preparation of 3 - [2-(5-nitro-2-furyl)-vinyl]-6-(4-methyl - 1 - piperazinyl-methyleneamine)-s-triazolo[4,3-b]pyridazine 3.0 g. 3-[2-(5-nitro - 2 - furyl)-vinyl]-6-ethoxymethylene-amino-s-triazolo[4,3-b]pyridazine were dissolved in 60 ml. hot dioxane, filtered over charcoal and 1.85 g. N-methyl-piperazine added dropwise at 50° C. The mixture was stirred for another 15 minutes and cooled to ambient temperature. The precipitated crystals were filtered off with suction, washed with dioxane and dried. 3 g. raw-material were obtained and recrystallised from dimethylformamide to give 2.2 g. 3-[2-(5-nitro-2-furyl)-vinyl]-6-(4 - methyl-1-piperazinyl-methyleneamine) - s - triazolo[4,3-b]pyridazine in the form of yellow crystals which melted, with decomposition, at 251–254° C.

In an analogous manner there were obtained from 1.65 g. 3 - [2-(5-nitro-2-furyl)-vinyl] - 6 - ethoxymethyleneamino-s-triazolo[4,3-b]pyridazine and the amines mentioned below:

1.1 g. 3-[2-(5-nitro - 2 - furyl)-vinyl]-6-(p-hydroxyphenyl-aminomethylene-amino) - s - triazolo[4,3-b]pyridazine from p-amino-phenol in redbrown crystals, which melted, with decomposition, after recrystallisation from dimethylformamide and dioxane at 270–273° C.

1.25 g. 3-[2-(5-nitro - 2 - furyl)-vinyl]-6-[(N-methyl-N-β-hydroxy-ethylamino)-methylene-amino] - s - triazolo[4,3-b]pyridazine from N-methyl-ethanolamine in yellow crystals, which melted, with decomposition, after recrystallisation from dimethylformamide and dioxane at 200–203° C.

1.2 g. 3-[2-(5-nitro - 2 - furyl)-vinyl]-6-(4-hydroxy-piperidino-methylene-amino) - s - triazolo[4,3-b]pyridazine from 4-hydroxy-piperidine in yellow crystals, which melted, with decomposition, after recrystallisation from dioxane at 134–138° C.

1.2 g. 3-[2-(5-nitro - 2 - furyl)-vinyl]-6-(N,N-di-β-hydroxy-ethylamino-methylene-amino) - s - triazolo[4,3-b] pyridazine from diethanolamine in yellow crystals, which melted, with decomposition, after recrystallization from dimethylformamide and dioxane at 168–170° C.

1.3 g. 3-[2-(5-nitro - 2 - furyl)-vinyl]-6-(β-hydroxy-ethylamino-methylene-amino) - s - triazolo[4,3-b]pyridazine from ethanolamine in yellow crystals, which melted, with decomposition, after recrystallisation from dimethylformamide and methanol at 181–183° C.

EXAMPLE 12

Preparation of 3-[2-(5-nitro-2-furyl)-vinyl]-6-(cyclohexyl-amino-methylene-amino)-s-triazolo[4,3-b]pyridazine 3.3 g. 3-[2-(5-nitro - 2 - furyl)-vinyl]-6-ethoxymethylene-amino - s - triazolo[4,3-b]pyridazine and 2.44 ml. cyclohexylamine were dissolved in 68 ml. dioxane and reacted in a manner analogous to that described in Example 11. There were obtained 2.95 g. 3-[2-(5-nitro-2-furyl)-vinyl]-6-(cyclohexyl - amino - methylene - amino)-s-triazolo[4,3-b]pyradizine in yellow crystals which melted at 170–174° C. after recrystallisation from methanol/dioxane.

EXAMPLE 13

Preparation of 3-[2-(5-nitro-2-furyl)-vinyl]-6-(aminomethylene-amino)-s-triazolo[4,3-b]pyridazine 5 g. 3 - [2-(5-nitro-2-furyl)-vinyl]-6-ethoxymethyleneamino-s-triazolo[4,3-b]pyridazine were dissolved in 100 ml. dioxane under heating and filtered over charcoal. Ammonia gas was introduced into the solution at 50° C. for about 10 minutes. The solution was stirred for another 5 minutes, cooled, the suspension obtained filtered with suction, the yellow crystals obtained washed with dioxane and dried. 3.2 g. of 3 - [2 - (5-nitro-2-furyl)-vinyl]-6-(amino-methylene-amino)-s-triazolo[4,3-b]pyridazine are obtained, which melted with decomposition at 237–242° C.

The bacteriostatic activity of the compounds in accordance with the invention was evaluted in vitro and in vivo. The following comparison compound and compounds according to the invention were used in the tests:

| Compound number | Chemical name |
| --- | --- |
| A (comparison compound) | N-(5-nitrofurfuryliden)-1-aminohydantoine (sold under the trade name "Furadantin" by Norwich Pharmacal Co.). |
| 1 | 2-[2-(5-nitro-2-furyl)-vinyl]-7-(dimethylamino-methyleneamino)-1-8-naphthryidine. |
| 2 | 3-[2-(5-nitro-2-furyl)-vinyl]-6-(dimethylaminomethyleneamino)-s-triazolo[4,3-b]pyridazine. |
| 3 | 3-[2-(5-nitro-2-thienyl)-vinyl]-6-dimethylaminomethyleneamino)-s-triazolo[4,3-b]pyridazine. |
| 4 | 3-[2-(5-nitro-2-furyl)-vinyl-6-(dimethylaminomethyl)-methyleneamino]-s-triazolo[4,3-b]pyridazine. |
| 5 | 1-methyl-2-{3-[2-(5-nitro-2-furyl)-vinyl]-s-trizaolo-[4,3-b]pyridazinyl-6]imino-pyrrolidine. |
| 6 | 3-[2-(5-nitro-2-furyl)-vinyl]-6-[(dimethylamino-methoxy-methyl)-methylene]-amino-s-triazolo[4,3-b]-pyridazine. |

TABLE—Continued

| Compound number | Chemical name |
|---|---|
| 7 | 3-[2-(5-nitro-2-furyl)-vinyl]-6-[(diethylaminomethyl)-methylene]-amino-s-triazolo[4,3-b]pyridazine. |
| 8 | 3-[2-(5-nitro-2-furyl)-vinyl]-6-[1-(1-pyrrolidinyl)-ethylidene]-amino-s-triazolo[4,3-b]-pyridazine. |
| 9 | 4-[2-(5-nitro-2-furyl)-vinyl]-2-methyl-7-(dimethyl-aminomethyleneamino)-1,8-naphthyridine. |
| 10 | 1-methyl-2{3-[2-(5-nitro-2-furyl)-vinyl]-s-triazolo[4,3-b]pyridazinyl-6}-imino-piperidine. |
| 11 | 3-[2-(5-nitro-2-furyl)-vinyl]-6-(diethyl-aminomethyl-ene)-s-triazolo[4,3-b]pyridazine. |
| 12 | 3-[2-(5-nitro-2-furyl)-vinyl]-6-(4-methyl-1-piperazinyl-methyleneamino)-s-triazolo[4,3-b]pyridazine. |
| 13 | 3-[2-(5-nitro-2-furyl)-vinyl]-6-(amino-methylene-amino)-s-triazolo-[4,3-b]pyridazine. |
| 14 | 3-[2-(5-nitro-2-furyl)-vinyl]-6-(β-hydroxyethylamino-methylene-amino)-s-triazolo[4,3-b]pyridazine. |
| 15 | 3-[2-(5-nitro-2-furyl)-vinyl]-6-(p-hydroxyphenyl-amino-methylene-amino)-s-triazolo[4,3-b]pyridazine |

TABLE I

Absolute bacteriostatic activity in vitro (minimal concentration in μg./ml.)

| Compound No. | Staphylococcus aureus, SG 511 | Streptococcus pyogenes, Aronson | Streptococcus faecalis | Escherichia coli | Proteus mirabilis | Pseudomonas aeruginosa |
|---|---|---|---|---|---|---|
| A | 16 | 4 | 16 | 8 | 128 | >128 |
| 1 | 0.016 | 0.008 | 0.000125 | 0.004 | 0.125 | 0.5 |
| 2 | 0.125 | 0.008 | 0.106 | 0.031 | 2 | 2 |
| 3 | 1 | 0.125 | 0.062 | 0.016 | >128 | 128 |
| 4 | 0.5 | 0.125 | 0.031 | 0.125 | >128 | >32 |
| 5 | | | 0.008 | 0.031 | 8 | 128 |
| 6 | 0.5 | 0.25 | | 0.5 | | |
| 7 | 0.5 | 1 | 0.125 | 1 | >128 | >32 |
| 8 | 0.5 | 0.125 | 0.031 | 0.5 | 256 | 64 |
| 9 | | | 0.016 | 0.062 | 0.5 | 2 |
| 10 | | | 0.008 | 0.125 | 64 | >64 |
| 11 | | | 0.008 | 0.031 | >256 | >64 |
| 12 | | | 0.062 | 0.031 | 2 | 1 |
| 13 | | | 0.125 | 0.031 | 0.5 | 2 |
| 14 | | | 0.062 | 0.031 | 1 | 2 |
| 15 | | | 0.125 | 0.031 | 0.5 | 2 |

TABLE II

Bacteriostatic activity of the urine and of the excreted amount of active substance in the urine of rats following oral administration Bacteriostatic maximum dilution of urine against Escherichia coli (106) determined in 50 ml. urine samples 22 hours after 20 mg. test compound per kg. body weight had been orally administered. 6 rats were employed for each experiment.

| Compound No.: | Maximum bacteriostatic dilution (volume ratio) |
|---|---|
| A | 1:54 |
| | 1:30 |
| | 1:41 |
| | 1:19 |
| | 1:40 |
| | 1:21 |
| 1 | 1:25 |
| | 1:23 |
| 2 | 1:229 |
| | 1:280 |
| 3 | 1:41 |
| | 1:30 |
| 4 | 1:67 |
| 7 | 1:44 |
| | 1:35 |
| 11 | 1:43 |
| 12 | 1:263 |
| | 1:233 |
| 13 | 1:122 |
| 14 | 1:328 |
| 15 | 1:113 |

The compounds of this invention are anti-microbials and have been found to be bactericidal to the pathogenes found in surface infections, gram negative as well as gram positive. They additionally have utility as agents for routine treatment of acute and chronic bacterial infections of the urinary tract, including those caused by Proteus ap. Further they lend themselves because of their properties to use in the prevention or treatment of mixed surface infections or wounds, severe burns, cutaneous ulcers, pyodermas, osteomyelitis, preparation of wound and burns for skin grafting and prevention of infection of grafts and donor sites.

The compounds of the invention can be employed in the form of aqueous solutions or suspensions thereof, as for instance, in the form of an 0.01 to 0.05% aqueous suspension or solution; in the form of solutions in non-aqueous, hygroscopic liquid vehicles such as polyethylene glycol, for instance 0.1–0.5% solutions in polyethylene glycol; incorporation into a water-soluble ointment-like base (concentration 0.1–0.5%) or in a powder base composed, for instance, of water-soluble polyethylene glycols (concentration 0.1–0.5%); or in a form suitable for ingestion. Thus, a preferred form is a tablet containing 50–200 mg. of active compound. Depending on the conditions, symptomatic and laboratory responses 100–400 mg. per day can be administered. Another preferred form for orally administering the compounds of the invention is in the form of a suspension thereof in a water miscible flavored gel. Such gel can contain from 1 to 10 mg. per cc.

It will be understood that the specification and samples are illustrative but not limitative of the present invention and that other embodiments within the spirit and scope of the invention will suggest themselves to those skilled in the art.

What is claimed is:

1. Nitrofurane compound of the formula

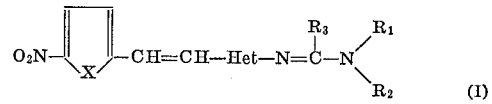

(I)

wherein $R_1$, $R_2$ and $R_3$, which may be the same or different, are hydrogen or lower alkyl, alkoxyalkyl, hydroxyalkyl, alkylmercaptoalkyl, cyclohexyl or hydroxy-phenyl, or two of the symbols $R_1$, $R_2$ and $R_3$, together with the atoms to which they are attached, can form pyrrolidine, piperidine or piperazine optionally substituted with hydroxyl or lower alkyl, X is a sulfur or oxygen atom and Het is a naphthyridine or s-triazolo[4,3-b]pyridazine system, which is optionally substituted by hydroxyl or amine groups or lower alkyl radicals; and the pharmacologically compatible salts thereof.

2. Nitrofurane compound of the formula

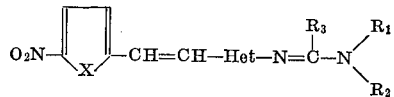

wherein $R_1$, $R_2$ and $R_3$, which may be the same or different, are hydrogen or lower alkyl, alkoxyalkyl or alkylmercaptoalkyl, or two of the symbols $R_1$, $R_2$ and $R_3$, together with the atoms to which they are attached, can also form pyrrolidine, piperidine or piperazine optionally substituted with hydroxyl or lower alkyl, X is a sulfur or oxygen atom and Het is a naphthyridine or s-triazolo-[4,3-b]pyridazine system, which is optionally substituted by hydroxyl or amine groups or lower alkyl radicals; and the pharmacologically compatible salts thereof.

3. Compound as claimed in Claim 1 wherein Het is naphthyridine.

4. Compound as claimed in Claim 1 wherein Het is s-triazolo[4,3-b]pyridazine.

5. Compound as claimed in Claim 1 wherein X is oxygen.

6. Compound as claimed in Claim 1 wherein X is sulfur.

7. Compound as claimed in Claim 1 designated 2-[2-(5 - nitro - 2 - furyl) - vinyl]-7-(dimethylaminomethyleneamino)-1,8 naphthyridine.

8. Compound as claimed in Claim 1 designated 3-[2-(5 - nitro - 2-furyl)-vinyl]-6-(dimethylamino-methyleneamino)-s-triazolo[4.3-b]pyridazine.

9. Compound as claimed in Claim 1, wherein two of $R_1$, $R_2$ and $R_3$ form a pyrrolidine moiety.

10. Compound as claimed in Claim 1, wherein two of $R_1$, $R_2$ and $R_3$ form a piperidine moiety.

11. Compound as claimed in Claim 1, wherein two of $R_1$, $R_2$ and $R_3$ form a lower alkyl substituted piperazinyl moiety.

References Cited

UNITED STATES PATENTS

| | | | |
|---|---|---|---|
| 3,483,193 | 12/1969 | Gall et al. | 260—240 A |
| 3,488,728 | 1/1970 | Wilhelm et al. | 260—240 A |

FOREIGN PATENTS

| | | | |
|---|---|---|---|
| 260,227 | 2/1968 | Austria | 260—240 A |
| 1,194,819 | 6/1970 | England | 260—240 A |

JOHN D. RANDOLPH, Primary Examiner

U.S. Cl. X.R.

260—240 A, 240 G, 250 A, 268 MK, 268 R, 293.87, 293.89, 296 N; 424—250, 263